(12) United States Patent
Konishi

(10) Patent No.: US 8,748,036 B2
(45) Date of Patent: Jun. 10, 2014

(54) NON-AQUEOUS SECONDARY BATTERY

(75) Inventor: Takashi Konishi, Kyoto (JP)

(73) Assignee: Hitachi, Ltd., Tokyo (JP)

( * ) Notice: Subject to any disclaimer, the term of this patent is extended or adjusted under 35 U.S.C. 154(b) by 66 days.

(21) Appl. No.: 13/394,558

(22) PCT Filed: Dec. 27, 2011

(86) PCT No.: PCT/JP2011/080294
§ 371 (c)(1),
(2), (4) Date: Mar. 7, 2012

(87) PCT Pub. No.: WO2013/098962
PCT Pub. Date: Jul. 4, 2013

(65) Prior Publication Data
US 2013/0164618 A1    Jun. 27, 2013

(51) Int. Cl.
*H01M 4/133* (2010.01)
*H01M 4/587* (2010.01)
*H01M 4/38* (2006.01)
*H01M 4/62* (2006.01)
*H01M 4/134* (2010.01)
*H01M 4/02* (2006.01)

(52) U.S. Cl.
CPC .............. *H01M 4/133* (2013.01); *H01M 4/587* (2013.01); *Y02E 60/122* (2013.01); *H01M 4/386* (2013.01); *H01M 4/623* (2013.01); *H01M 4/134* (2013.01); *H01M 2004/021* (2013.01)
USPC ...... 429/209; 429/212; 429/231.95; 429/235; 429/231.7; 429/249

(58) Field of Classification Search
CPC .......... H01M 2004/021; H01M 4/133; H01M 4/134; H01M 4/386; H01M 4/587; H01M 4/623; Y02E 60/122
USPC ............ 429/303, 209, 212, 217, 231.95, 235, 429/249
See application file for complete search history.

(56) References Cited

U.S. PATENT DOCUMENTS 5,589,297 A * 12/1996 Koga et al. ..................... 429/212
2006/0281004 A1* 12/2006 Yata et al. ...................... 429/162
(Continued)

FOREIGN PATENT DOCUMENTS

| JP | 2010-251314 A | 11/2010 |
|---|---|---|
| JP | 2010-251315 A | 11/2010 |
| JP | 2011-210462 A | 10/2011 |

OTHER PUBLICATIONS

International Search Report dated Jun. 12, 2012 for International Application No. PCT/JP2011/080294 (PCT/ISA/210).
(Continued)

*Primary Examiner* — Patrick Ryan
*Assistant Examiner* — Ben Lewis
(74) *Attorney, Agent, or Firm* — Birch, Stewart, Kolasch & Birch, LLP

(57) ABSTRACT

A negative electrode active material of a non-aqueous secondary battery of the present invention includes a first active material, a second active material, and a third active material. The first active material is a carbon material having a D/G ratio of 0.15 or less, where G represents the peak intensity observed in a Raman spectrum from 1578 to 1592 $cm^{-1}$ and D represents the peak intensity observed in a Raman spectrum from 1349 to 1353 $cm^{-1}$ of Raman spectroscopy. The D50 of the second active material is 10 μm or less. The second active material includes at least one of a first carbon material having the D/G ratio of 0.2 to 2.0 and a second carbon material having the D/G ratio of 1.0 to 2.0. The D50 of the third active material is 5 μm or less. The third active material contains silicon and oxygen as constituent elements.

4 Claims, 1 Drawing Sheet

(56) References Cited

U.S. PATENT DOCUMENTS

| | | | |
|---|---|---|---|
| 2007/0275302 A1* | 11/2007 | Sotowa et al. | 429/217 |
| 2008/0099732 A1* | 5/2008 | Nagao et al. | 252/511 |
| 2009/0169994 A1* | 7/2009 | Mah et al. | 429/218.1 |
| 2009/0186274 A1* | 7/2009 | Wakita et al. | 429/217 |
| 2009/0196816 A1* | 8/2009 | Yamamoto et al. | 423/448 |
| 2009/0197176 A1* | 8/2009 | Kim et al. | 429/231.5 |
| 2010/0119956 A1* | 5/2010 | Tokuda et al. | 429/338 |
| 2012/0052393 A1 | 3/2012 | Kameda et al. | |
| 2012/0064403 A1 | 3/2012 | Kameda et al. | |

OTHER PUBLICATIONS

Machine-generated English translation of JP-2010-212228-A dated Sep. 24, 2010.

Office Action dated Jun. 19, 2012 for Japanese Application No. 2012-508696.

* cited by examiner

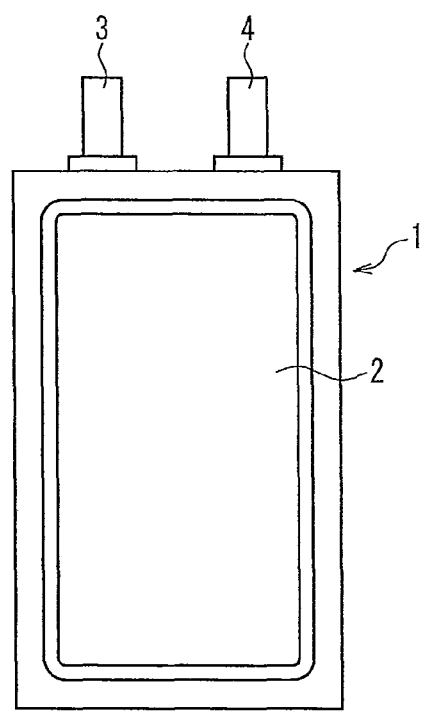

NON-AQUEOUS SECONDARY BATTERY

TECHNICAL FIELD

The present invention relates to a non-aqueous secondary battery such as a lithium ion secondary battery.

BACKGROUND ART

A non-aqueous secondary battery, as typified by a lithium ion secondary battery, is characterized by a high energy density and thus has been widely used as a power source for portable equipment such as a portable telephone and a notebook personal computer. The capacity of the lithium ion secondary battery is likely to increase further as the performance of the portable equipment becomes higher. Accordingly, research and development is progressing to further improve the energy density of the lithium ion secondary battery.

On the other hand, due to the improved performance of the non-aqueous secondary battery, the non-aqueous secondary battery has recently started to be used as a power source other than that for the portable equipment. For example, the non-aqueous secondary battery has started to be used as a power source for automobiles, motorcycles, movable bodies such as a robot, etc. When the non-aqueous secondary battery is used as a power source for automobiles, motorcycles, movable bodies such as a robot, etc., the capacity needs to be increased even more.

As a measure to increase the capacity of the non-aqueous secondary battery, there is a method for increasing the thickness of an electrode mixture layer. However, such an increase in the thickness of the electrode mixture layer can reduce the capacity during high-current charge and discharge. One reason for this is probably because the number of active materials that are farther away from a current collector increases as the electrode mixture layer becomes thicker, so that the conductivity in the electrode is reduced.

As another measure to increase the capacity of the non-aqueous secondary battery, there is a method for using a high-capacity negative electrode material such as $SiO_x$ having a structure in which Si ultrafine particles are dispersed in a $SiO_2$ matrix (see, e.g., Patent Documents 1 to 3). However, this type of high-capacity negative electrode material undergoes a very large volume change during charge and discharge. Therefore, a battery using the high-capacity negative electrode material has a problem that the battery characteristics are sharply reduced by the repetition of charge and discharge.

To solve this problem, e.g., Patent Document 4 proposes a non-aqueous secondary battery that can improve the charge-discharge cycle characteristics by using a combination of a material containing Si and O as constituent elements and graphite.

PRIOR ART DOCUMENTS

Patent Documents

Patent Document 1: JP 2004-47404 A
Patent Document 2: JP 2005-259697 A
Patent Document 3: JP 2007-242590 A
Patent Document 4: JP 2010-212228 A

DISCLOSURE OF INVENTION

Problem to be Solved by the Invention

However, in the non-aqueous secondary battery as disclosed in Patent Document 4, although the charge-discharge cycle characteristics are improved, when the thickness of the electrode mixture layer is increased to further increase the capacity, the charge-discharge load characteristics and the charge-discharge cycle characteristics are found to be reduced due to a high current.

The present invention has solved the above problem and provides a non-aqueous secondary battery that can improve the charge-discharge load characteristics and the charge-discharge cycle characteristics at a high current.

Means for Solving Problem

A non-aqueous secondary battery of the present invention includes a positive electrode, a negative electrode, a non-aqueous electrolyte, and a separator. The negative electrode includes a negative electrode mixture layer that includes a negative electrode active material and a binder. The negative electrode mixture layer has a density of 1.4 g/cm$^3$ or less. The negative electrode active material includes a first active material, a second active material, and a third active material. The first active material is a carbon material having a D/G ratio of 0.15 or less, where G represents the peak intensity observed in a Raman spectrum from 1578 to 1592 cm$^{-1}$ and D represents the peak intensity observed in a Raman spectrum from 1349 to 1353 cm$^{-1}$ of Raman spectroscopy. The D50 of the second active material is 10 μm or less. The second active material includes at least one of a first carbon material having the D/G ratio of 0.2 to 2.0 and a second carbon material having the D/G ratio of 1.0 to 2.0. The D50 of the third active material is 5 μm or less. The third active material contains silicon and oxygen as constituent elements. The content of the first active material is 10 wt % to 57 wt % of the total weight of the negative electrode active material. The content of the third active material is 1 wt % to 10 wt % of the total weight of the negative electrode active material. When the second active material includes the second carbon material, the content of the second carbon material is 40 wt % or less of the total weight of the negative electrode active material.

Effects of the Invention

The present invention can provide a non-aqueous secondary battery that can improve the charge-discharge load characteristics and the charge-discharge cycle characteristics at a high current.

BRIEF DESCRIPTION OF DRAWING

FIG. 1 is a plan view showing an example of a non-aqueous secondary battery of the present invention.

DESCRIPTION OF THE INVENTION

A non-aqueous secondary battery of the present invention includes a positive electrode, a negative electrode, a non-aqueous electrolyte, and a separator. The negative electrode includes a negative electrode mixture layer that includes a negative electrode active material and a binder. The negative electrode mixture layer has a density of 1.4 g/cm$^3$ or less. When the density of the negative electrode mixture layer is set to 1.4 g/cm$^3$ or less, pores can be sufficiently held in the negative electrode mixture layer, the expansion and contraction of a third active material (as described below) can be relaxed, and the permeability of an electrolytic solution can be improved.

The negative electrode active material includes a first active material, a second active material, and the third active material.

The first active material is a carbon material having a D/G ratio of 0.15 or less, where G represents the peak intensity observed in a Raman spectrum from 1578 to 1592 cm$^{-1}$ and D represents the peak intensity observed in a Raman spectrum from 1349 to 1353 cm$^{-1}$ of Raman spectroscopy. The first active material is a high crystalline graphite material and has a high conductivity. On the other hand, the second active material and the third active material other than the first active material have a low conductivity. However, the use of the first active material can ensure the conductivity of the whole negative electrode, and also can improve the charge-discharge cycle characteristics at a high current.

The D50 of the second active material is set to 10 μm or less. The second active material includes at least one of a first carbon material having a D/G ratio of 0.2 to 2.0 and a second carbon material having a D/G ratio of 1.0 to 2.0, where G represents the peak intensity observed in a Raman spectrum from 1578 to 1592 cm$^{-1}$ and D represents the peak intensity observed in a Raman spectrum from 1349 to 1353 cm$^{-1}$ of Raman spectroscopy. Although the conductivity of the second active material is low, the second active material has high liquid absorbency and a small particle size. Therefore, the electrolytic solution can be efficiently supplied to the pores of the negative electrode mixture layer. Thus, the use of the second active material can improve the charge-discharge load characteristics at a high current.

The D50 of the third active material is set to 5 μm or less. The third active material contains silicon (Si) and oxygen (O) as constituent elements. The third active material is a high-capacity material and can serve to increase the capacity of the battery.

Both the second active material and the third active material can sufficiently receive Li ions and provide excellent charge characteristics even at a high current.

The content of the first active material is 10 wt % to 57 wt % of the total weight of the negative electrode active material. The content of the third active material is 1 wt % to 10 wt % of the total weight of the negative electrode active material. With these contents, the first active material, the second active material, and the third active material can exhibit their respective properties in the negative electrode active material.

However, when the second active material includes the second carbon material, the content of the second carbon material needs to be set to 40 wt % or less of the total weight of the negative electrode active material. If the content of the second carbon material is more than 40 wt %, it is difficult to increase the density of the negative electrode mixture layer, and thus the adhesion between the negative electrode mixture layer and a negative electrode current collector is reduced, resulting in poor charge-discharge cycle characteristics.

Next, components of the non-aqueous secondary battery of the present invention will be described.

[Negative Electrode]

The negative electrode of the non-aqueous secondary battery of the present invention may have a structure in which, e.g., the negative electrode mixture layer that includes a negative electrode active material and a binder, and optionally a conductive assistant or the like, is provided on one side or both sides of a current collector.

<Negative Electrode Active Material>

As described above, the negative electrode active material includes the first active material, the second active material, and the third active material.

The first active material is a carbon material having a D/G ratio of 0.15 or less, where G represents the peak intensity observed in a Raman spectrum from 1578 to 1592 cm$^{-1}$ and D represents the peak intensity observed in a Raman spectrum from 1349 to 1353 cm$^{-1}$ of Raman spectroscopy, and corresponds to a high crystalline graphite material. The lower limit of the D/G ratio is not particularly limited, and is generally about 0.05.

Examples of the high crystalline graphite material include natural graphite such as scale-shaped or spherical graphite; artificial graphite obtained by graphitizing an easily-graphitizable carbon such as pyrolytic carbons, mesophase carbon microbeads (MCMB), or carbon fibers at 2800° C. or higher; and carbons obtained by coating the surface of a hardly-graphitizable carbon with graphite. The content of the first active material is set to 10 wt % to 57 wt % of the total weight of the negative electrode active material.

The D50 of the first active material is preferably 15 μm to 20 μm, since this range makes work easy. In the present specification, the D50 means the value of a particle diameter at the cumulative volume percentage of 50%. The particle diameter can be measured, e.g., by a laser diffraction scattering method. According to this method, specifically, the measuring object is dispersed in a liquid phase such as water and irradiated with a laser beam to detect scattering intensity distribution, and the particle size distribution is measured using the scattering intensity distribution. The measuring device for the laser diffraction scattering method may be, e.g., "MICROTRAC HRA" manufactured by Nikkiso Co., Ltd.

The second active material includes at least one of the first carbon material having the D/G ratio of 0.2 to 2.0 and the second carbon material having the D/G ratio of 1.0 to 2.0. The content of the second active material may be set to 45 wt % to 80 wt % of the total weight of the negative electrode active material. The D50 of the second active material is set to 10 μm or less. The production limit of the lower limit of the D50 of the second active material is about 5 μm.

The first carbon material may be, e.g., a carbon material obtained by coating the natural graphite or the artificial graphite with an amorphous layer of petroleum pitch, coal pitch, or the like (i.e., pitch-coated graphite) or a carbon material obtained by coating carboxymethyl cellulose (CMC) and then firing it at a high temperature. The pitch may be an isotropic pitch. The thickness of the coating layer is not particularly limited, and may be appropriately adjusted so that the D/G ratio falls in the range of 0.2 to 2.0. The pitch-coated graphite can be produced by coating the graphite that is to be a core with the pitch and then firing the coated graphite.

The second carbon material may be an intermediate crystalline material in which the D/G ratio of the whole material is in the range of 1.0 to 2.0. The intermediate crystalline material has intermediate crystallinity between the high crystalline graphite material and the amorphous carbon material, and corresponds to a so-called soft carbon or the like. The second carbon material can be produced, e.g., by firing the easily-graphitizable carbon at about 1000° C. or lower.

When the second active material includes the second carbon material, the content of the second carbon material is set to 40 wt % or less of the total weight of the negative electrode active material.

The third active material contains silicon (Si) and oxygen (O) as constituent elements. The D50 of the third active material is set to 5 μm or less. The production limit of the lower limit of the D50 of the third active material is about 3 μm. The third active material is preferably a material expressed by SiO$_x$ containing Si and O as constituent elements. The content of the third active material is set to 1 wt % to 10 wt % of the total weight of the negative electrode active material.

The $SiO_x$ may include microcrystals or an amorphous phase of Si. In this case, the atomic ratio of Si and O is determined by incorporating the microcrystals or the amorphous phase of Si. In other words, the $SiO_x$ includes a structure in which Si (e.g., microcrystalline Si) is dispersed in an amorphous $SiO_2$ matrix, and the atomic ratio x, incorporating the amorphous $SiO_2$ and the Si dispersed in the amorphous $SiO_2$, may satisfy $0.5 \leq x \leq 1.5$. For example, when a material has a structure in which Si is dispersed in an amorphous $SiO_2$ matrix, and the molar ratio of $SiO_2$ and Si is 1:1, the structural formula of this material can be represented by SiO because x=1 is established. In the case of the material having such a structure, a peak due to the presence of Si (microcrystalline Si) may not be observed, e.g., by X-ray diffraction analysis, but the presence of fine Si can be confirmed by transmission electron microscope observation.

It is preferable that the $SiO_x$ is combined with a carbon material to form a composite. For example, it is desirable that the surface of the $SiO_x$ is coated with the carbon material. In general, the $SiO_x$ has poor conductivity. Therefore, when the $SiO_x$ is used as the negative electrode active material, in terms of ensuring good battery characteristics, it is necessary that a conductive material (conductive assistant) is added and then mixed and dispersed sufficiently with the $SiO_x$ in the negative electrode so as to form an excellent conductive network. The use of the composite of the $SiO_x$ and the carbon material can provide a better conductive network in the negative electrode than the use of a material obtained, e.g., by simply mixing the $SiO_x$ and the conductive material such as the carbon material.

The specific resistance value of the $SiO_x$ is generally $10^3$ to $10^7$ kΩcm, while the specific resistance value of the carbon material as described above is generally $10^{-5}$ to 10 kΩcm. The conductivity of the $SiO_x$ can be improved by combining the $SiO_x$ and the carbon material.

The composite of the $SiO_x$ and the carbon material may be, e.g., a granular material of the $SiO_x$ and the carbon material, in addition to the above composite obtained by coating the surface of the $SiO_x$ with the carbon material.

Preferred examples of the carbon material that can be used with the $SiO_x$ to form the composite include a low crystalline carbon, carbon nanotube, and a vapor grown carbon fiber.

Specifically, it is preferable that the carbon material is at least one selected from the group consisting of a fibrous or coil-shaped carbon material, carbon black (including acetylene black and Ketjen Black), artificial graphite, an easily-graphitizable carbon, and a hardly-graphitizable carbon. The fibrous or coil-shaped carbon material is preferred because it has a large surface area and allows the conductive network to be easily formed. The carbon black (including acetylene black and Ketjen. Black), the easily-graphitizable carbon, and the hardly-graphitizable carbon are preferred because they have high electrical conductivity and high liquid-retaining property, and also are likely to remain in contact with $SiO_x$ particles even if the $SiO_x$ particles expand and contract.

Among the above carbon materials, it is particularly preferable to use the fibrous carbon material when the composite of the $SiO_x$ and the carbon material is a granular material. This is because the fibrous carbon material is in the form of a fine thread and highly flexible, and thus can follow the expansion and contraction of the $SiO_x$ during charge and discharge of the battery. Moreover, the fibrous carbon material has a high bulk density, and thus can have many contact points with the $SiO_x$ particles. Examples of the fibrous carbon include a polyacrylonitrile (PAN) carbon fiber, a pitch carbon fiber, a vapor grown carbon fiber, and carbon nanotube. Any of them can be used.

When the composite of the $SiO_x$ and the carbon material is used for the negative electrode, the ratio of the $SiO_x$ and the carbon material is determined so that the carbon material is preferably 5 parts by weight or more, and more preferably 10 parts by weight or more with respect to 100 parts by weight of the $SiO_x$ to produce a good effect of the combination of the $SiO_x$ and the carbon material. In the composite, if the ratio of the carbon material that is to be combined with the $SiO_x$ is too large, the amount of the $SiO_x$ in the negative electrode mixture layer is reduced, which in turn may reduce the effect of increasing the capacity. Therefore, the carbon material is preferably 50 parts by weight or less, and more preferably 40 parts by weight or less with respect to 100 parts by weight of the $SiO_x$.

The composite of the $SiO_x$ and the carbon material can be obtained, e.g., in the following manner.

When the composite is formed by coating the surface of the $SiO_x$ with the carbon material, e.g., the $SiO_x$ particles and a hydrocarbon gas are heated in a gas phase, and the carbon produced by the thermal decomposition of the hydrocarbon gas is deposited on the surfaces of the particles. Such a chemical vapor deposition (CVD) method allows the hydrocarbon gas to spread over the individual $SiO_x$ particles, so that a thin uniform film (carbon material coating layer) that includes the carbon material with conductivity can be formed on the surfaces of the particles. Thus, it is possible to uniformly impart conductivity to the $SiO_x$ particles with a small amount of the carbon material.

In the production of the $SiO_x$ coated with the carbon material, the treatment temperature (ambient temperature) of the CVD method varies depending on the type of the hydrocarbon gas, and is generally 600 to 1200° C. In particular, the treatment temperature is preferably 700° C. or higher, and more preferably 800° C. or higher. This is because the residual impurities decrease with an increase in treatment temperature, and a coating layer including highly conductive carbon can be formed.

As a liquid source of the hydrocarbon gas, toluene, benzene, xylene, mesitylene, or the like can be used. For ease of handling, toluene is particularly preferred. The hydrocarbon gas can be obtained by evaporating the liquid source (e.g., by bubbling with a nitrogen gas). Moreover, a methane gas or acetylene gas also can be used.

When the granular material of the $SiO_x$ and the carbon material is produced, a dispersion in which the $SiO_x$ is dispersed in a dispersion medium is prepared and then sprayed and dried to produce a granular material including a plurality of particles. The dispersion medium may be, e.g., ethanol. It is appropriate that the dispersion is generally sprayed in an atmosphere at 50 to 300° C. In addition to the above method, the granular material of the $SiO_x$ and the carbon material also can be produced by a mechanical granulation method using a vibrating or planetary ball mill, a rod mill, or the like.

In the above negative electrode, the content of the composite of the $SiO_x$ and the carbon material in the negative electrode active material is preferably 0.01 wt % or more, more preferably 1 wt % or more, and further preferably 3 wt % or more so as to adequately ensure the effect of increasing the capacity with the use of the $SiO_x$. Moreover, the content of the composite of the $SiO_x$ and the carbon material in the negative electrode active material is preferably 20 wt % or less, and more preferably 15 wt % or less so as to successfully avoid the problem due to the volume change of the $SiO_x$ during charge and discharge.

<Binder>

Examples of the binder used for the negative electrode include the following: polysaccharides such as starch, polyvinyl alcohol, polyacrylic acid, carboxymethyl cellulose (CMC), hydroxypropyl cellulose, regenerated cellulose, and diacetyl cellulose and modified forms of these polysaccharides; thermoplastic resins such as polyvinyl chloride, polyvinyl pyrrolidone (PVP), polytetrafluoroethylene, polyhexafluoropropylene, polyvinylidene fluoride, polyethylene, polypropylene, polyamide-imide, and polyamide and modified forms of these thermoplastic resins; polyimide; and elastic polymers such as ethylene-propylene-diene terpolymer (EPDM), sulfonated EPDM, styrene-butadiene rubber (SBR), butadiene rubber, polybutadiene, fluorocarbon rubber, and polyethylene oxide and modified forms of these elastic polymers. The above examples of the binder may be used individually or in combinations of two or more.

Among the above binders, the fluorocarbon rubber made of a polymer that includes at least one monomer unit selected from tetrafluoroethylene and hexafluoropropylene is preferred. This fluorocarbon rubber is flexible and can be used as a binder to accommodate the volume change of the $SiO_x$ during charge and discharge. Moreover, the fluorocarbon rubber can improve the adhesion between the negative electrode mixture layer and the negative electrode current collector.

<Conductive Assistant>

The negative electrode mixture layer may further include a conductive material as a conductive assistant. The conductive material is not particularly limited as long as it does not cause any chemical change in the battery. Examples of the conductive material include the following: carbon materials such as carbon black (thermal black, furnace black, channel black, Ketjen Black, acetylene black, etc.) and a carbon fiber; metal materials such as metal powder (copper powder, nickel powder, aluminum powder, silver powder, etc.) and a metal fiber; and a polyphenylene derivative (as disclosed in JP S59-20971 A). The above examples of the conductive material may be used individually or in combinations of two or more. Among them, the vapor grown carbon fiber having a fiber length of 10 μm to 20 μm, and the carbon material having a specific surface area of 13 m$^2$/g or less and an oil absorption value of 1.5 mL/g or less are particularly preferred. This is because the vapor grown carbon fiber is in the form of a fine thread and highly flexible, and thus can follow the expansion and contraction of the $SiO_x$ during charge and discharge of the battery. Moreover, the vapor grown carbon fiber has a high bulk density, and thus can have many contact points with the $SiO_x$ particles. Further, the carbon material with an oil absorption value of 1.5 mL/g or less can suppress the consumption of the electrolytic solution, so that the cycle life can be improved.

<Current Collector>

The current collector used for the negative electrode may be, e.g., a metal foil, a punching metal, a mesh, or an expanded metal made of copper, nickel, or the like. In general, a copper foil is used. When the thickness of the whole negative electrode is reduced to achieve a battery with a high energy density, the upper limit of the thickness of the negative electrode current collector is preferably 30 μm, and the lower limit of the thickness of the negative electrode current collector is preferably 5 μm so as to ensure the mechanical strength.

<Method for Producing Negative Electrode>

The negative electrode can be produced in the following manner. For example, the negative electrode active material and the binder, and optionally the conductive assistant are dispersed in a solvent such as N-methyl-2-pyrrolidone (NMP) or water to prepare a negative electrode mixture containing composition in the form of a paste or slurry (in this case, the binder may be dissolved in the solvent). This composition is applied to one side or both sides of the current collector and dried, which then is subjected to calendering as needed. The method for producing the negative electrode is not limited to the above method, and the negative electrode also can be produced by other methods.

<Negative Electrode Mixture Layer>

In the negative electrode mixture layer, it is preferable that the total amount of the negative electrode active material is 80 to 99 wt %, and the amount of the binder is 1 to 20 wt %. When the conductive material is additionally used as the conductive assistant, the negative electrode mixture layer preferably includes the conductive material to the extent that both the total amount of the negative electrode active material and the amount of the binder satisfy the above suitable values. The thickness of the negative electrode mixture layer is preferably, e.g., 50 to 400 μm. By making the thickness of the negative electrode mixture layer as large as possible within this range, the capacity of the non-aqueous secondary battery can be increased.

The density of the negative electrode mixture layer is set to 1.4 g/cm$^3$ or less. The lower limit of the density of the negative electrode mixture layer is not particularly limited, and is generally about 1.2 g/cm$^3$.

[Positive Electrode]

The positive electrode of the non-aqueous secondary battery of the present invention may have a structure in which, e.g., a positive electrode mixture layer that includes a positive electrode active material, a conductive assistant, a binder, and the like is provided on one side or both sides of a current collector.

<Positive Electrode Active Material>

The positive electrode active material used for the positive electrode is not particularly limited, and may be a general active material such as a lithium-containing transition metal oxide. Specific examples of the lithium-containing transition metal oxide include $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_2$, $Li_xMn_yNi_zCo_{1-y-z}O_2$, $Li_xMn_2O_4$, and $Li_xMn_{2-y}M_yO_4$. In each of the above structural formulas, M represents at least one metal element selected from the group consisting of Mg, Mn, Fe, Co, Ni, Cu, Zn, Al, Ti, Ge, and Cr, and x, y, and z satisfy $0 \leq x \leq 1.1$, $0 < y < 1.0$, and $2.0 < z < 1.0$, respectively.

<Binder>

Both thermoplastic resin and thermosetting resin may be used as the binder of the positive electrode as long as they are chemically stable in the battery. Examples of the binder include the following: polyvinylidene fluoride (PVDF), polyethylene, polypropylene, polytetrafluoroethylene (PTFE), polyhexafluoropropylene (PHFP), styrene-butadiene rubber (SBR), a tetrafluoroethylene-hexafluoroethylene copolymer, a tetrafluoroethylene-hexafluoropropylene copolymer (FEP), a tetrafluoroethylene-perfluoroalkylvinyl ether copolymer (PFA), an ethylene-tetrafluoroethylene copolymer (ETFE), polychlorotrifluoroethylene (PCTFE), a propylene-tetrafluoroethylene copolymer, an ethylene-chlorotrifluoroethylene copolymer (ECTFE) or an ethylene-acrylic acid copolymer, an ethylene-methacrylic acid copolymer, an ethylene-methyl acrylate copolymer, an ethylene-methyl methacrylate copolymer, and Na ion crosslinked materials of these copolymers. The above examples of the binder may be used individually or in combinations of two or more.

<Conductive Assistant>

The conductive assistant used for the positive electrode is not particularly limited as long as it is chemically stable in the battery. Examples of the conductive assistant include the following: graphite such as natural graphite and artificial graphite; carbon black such as acetylene black, Ketjen Black (trade name), channel black, furnace black, lamp black, and thermal black; conductive fibers such as a carbon fiber and a metal fiber; metal powder such as aluminum powder; fluorocarbon; a zinc oxide; conductive whisker made of potassium titanate or the like; conductive metal oxides such as a titanium oxide; and organic conductive materials such as a polyphenylene derivative. The above examples of the conductive assistant may be used individually or in combinations of two or more. Among the above materials, the graphite with high conductivity and the carbon black with excellent liquid absorbency are preferred. The conductive assistant is not limited to the form of primary particles, and may be in the form of an aggregate such as a secondary aggregate or a chain structure. The conductive assistant in the form of an aggregate is easy to handle and can improve the productivity.

<Current Collector>

The current collector used for the positive electrode may be the same as that used for the positive electrode of a conventionally known lithium ion secondary battery. For example, an aluminum foil with a thickness of 10 to 30 µm is preferred.

<Method for Producing Positive Electrode>

The positive electrode can be produced in the following manner. For example, the positive electrode active material, the conductive assistant, and the binder are dispersed in a solvent such as N-methyl-2-pyrrolidone (NMP) to prepare a positive electrode mixture containing composition in the form of a paste or slurry (in this case, the binder may be dissolved in the solvent). This composition is applied to one side or both sides of the current collector and dried, which then is subjected to calendering as needed. The method for producing the positive electrode is not limited to the above method, and the positive electrode also can be produced by other methods.

<Positive Electrode Mixture Layer>

In the positive electrode mixture layer, it is preferable that the total amount of the positive electrode active material is 92 to 95 wt %, the amount of the conductive assistant is 3 to 6 wt %, and the amount of the binder is 3 to 6 wt %. The thickness of the positive electrode mixture layer formed on one side of the current collector is preferably 70 to 300 µm after calendering. By making the thickness of the positive electrode mixture layer as large as possible within this range, the capacity of the non-aqueous secondary battery can be increased. Thus, the electric capacity per unit area of one side of the positive electrode mixture layer can be 3 mAh/cm$^2$ or more. In the present specification, the electric capacity is determined by multiplying a theoretical capacity by a coulombic efficiency, and the coulombic efficiency is the ratio of a discharge capacity to a charge capacity (discharge capacity/charge capacity).

[Non-Aqueous Electrolyte]

The non-aqueous electrolyte of the non-aqueous secondary battery of the present invention may be a non-aqueous electrolytic solution in which a lithium salt is dissolved in an organic solvent.

The lithium salt used for the non-aqueous electrolytic solution is not particularly limited as long as it dissociates in the solvent to produce a lithium ion and is not likely to cause a side reaction such as decomposition in the working voltage range of the battery. Examples of the lithium salt include inorganic lithium salts such as $LiClO_4$, $LiPF_6$, $LiBF_4$, $LiAsF_6$, and $LiSbF_6$, and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$), and $LiN(RfOSO_2)_2$ (where Rf represents a fluoroalkyl group).

The concentration of the lithium salt in the non-aqueous electrolytic solution is preferably 0.5 to 1.5 mol/L, and more preferably 0.9 to 1.25 mol/L.

The organic solvent used for the non-aqueous electrolytic solution is not particularly limited as long as it dissolves the lithium salt and does not cause a side reaction such as decomposition in the working voltage range of the battery. Examples of the organic solvent include the following: cyclic carbonates such as ethylene carbonate, propylene carbonate, and butylene carbonate; chain carbonates such as dimethyl carbonate, diethyl carbonate, and methyl ethyl carbonate; chain esters such as methyl propionate; cyclic esters such as γ-butyrolactone; chain ethers such as dimethoxyethane, diethyl ether, 1,3-dioxolane, diglyme, triglyme, and tetraglyme; cyclic ethers such as dioxane, tetrahydrofuran, and 2-methyltetrahydrofuran; nitriles such as acetonitrile, propionitrile, and methoxypropionitrile; and sulfurous esters such as ethylene glycol sulfite. The organic solvent may be a mixture of two or more of these materials. A combination of the materials capable of achieving a high conductivity, e.g., a mixed solvent of the ethylene carbonate and the chain carbonate is preferred for better characteristics of the battery.

[Separator]

It is preferable that the separator of the non-aqueous secondary battery of the present invention has the property of being able to close its pores (i.e., a shutdown function) in the range of 80° C. (more preferably 100° C.) to 170° C. (more preferably 150° C.). The separator may be a separator used for a general lithium ion secondary battery or the like, e.g., a microporous film made of polyolefin such as polyethylene (PE) or polypropylene (PP). The microporous film of the separator may include only PE or PP. Alternatively, the microporous film may be in the form of a laminate of a PE microporous film and a PP microporous film.

[Battery Form]

The non-aqueous secondary battery of the present invention may be cylindrical in shape (e.g., a rectangular or circular cylinder) and use an outer can made of steel, aluminum, or the like. The non-aqueous secondary battery also may be a soft package battery using a metal-deposited laminated film as an outer package.

EXAMPLES

Hereinafter, the present invention will be described in detail by way of examples. However, the present invention is not limited to the following examples.

Example 1

<Production of Negative Electrode>

First, as the first active material, artificial graphite "MAG" (trade name) manufactured by Hitachi Chemical Co., Ltd. was prepared. The artificial graphite had a D/G ratio of 0.072, where G represents the peak intensity observed in a Raman spectrum from 1578 to 1592 cm$^{-1}$ and D represents the peak intensity observed in a Raman spectrum from 1349 to 1353 cm$^{-1}$ of Raman spectroscopy. The D50 of the artificial graphite was 20 µm.

Next, as the second active material (the first carbon material), pitch-coated graphite obtained by coating the surfaces of natural graphite particles (D50=9 µm) with petroleum pitch was prepared. The pitch-coated graphite had a D/G ratio of 0.252, where G represents the peak intensity observed in a Raman spectrum from 1578 to 1592 cm$^{-1}$ and D represents the peak intensity observed in a Raman spectrum from 1349 to 1353 cm$^{-1}$ of Raman spectroscopy.

Subsequently, SiO (D50=5.0 μm) was heated at about 1000° C. in an ebullating-bed reactor, and the heated particles were brought into contact with a mixed gas (25° C.) of methane and a nitrogen gas so that a CVD process was performed at 1000° C. for 60 minutes. The carbon (also referred to as "CVD carbon" in the following) produced by the thermal decomposition of the mixed gas was deposited on the SiO particles to form a coating layer. Thus, carbon-coated SiO was provided as the third active material.

The composition of the carbon-coated SiO was calculated from a change in weight before and after the formation of the coating layer and found to be SiO:CVD carbon=85:15 (weight ratio).

Next, 45 parts by weight of the artificial graphite (the first active material), 45 parts by weight of the pitch-coated graphite (the second active material: the first carbon material), 10 parts by weight of the carbon-coated SiO (the third active material), 1.2 parts by weight of CMC and 1 part by weight of SBR (both of which were used as the binder), and water were mixed and dispersed with a planetary mixer to prepare a negative electrode mixture containing slurry. Subsequently, the negative electrode mixture containing slurry was uniformly applied to one side of a copper foil (the negative electrode current collector) having a thickness of 10 μm by using a blade coater, which then was dried at 100° C., and further subjected to vacuum drying at 100° C. for 15 hours. Thereafter, the resultant copper foil was pressed by a roller press to form a negative electrode precursor having a negative electrode mixture layer with a thickness of 150 μm. When the negative electrode mixture containing slurry was applied to the copper foil, a portion of the copper foil was left uncoated and exposed.

Finally, the negative electrode precursor was cut so that the area of the negative electrode mixture layer was 35 mm×35 mm, and the exposed portion of the copper foil was contained. Moreover, a nickel lead piece for drawing a current was welded to the exposed portion of the copper foil. Thus, a negative electrode provided with a lead was produced. The negative electrode mixture layer of the negative electrode had a density of 1.4 g/cm$^3$.

<Production of Positive Electrode>

93 parts by weight of LiCoO$_2$ (the positive electrode active material), 3.5 parts by weight of acetylene black (the conductive assistant), 3.2 parts by weight of PVDF (the binder), and 0.3 parts by weight of polyvinyl pyrrolidone (PVP) (a dispersing agent) were mixed, to which a proper amount of NMP was further added, and then mixed and dispersed with a planetary mixer to prepare a positive electrode mixture containing slurry. Subsequently, the positive electrode mixture containing slurry was uniformly applied to one side of an aluminum foil (the positive electrode current collector) having a thickness of 13 μm, which then was dried at 85° C., and further subjected to vacuum driving at 100° C. for 8 hours. Thereafter, the resultant aluminum foil was pressed by a roller press to form a positive electrode precursor having a positive electrode mixture layer with a thickness of 130 μm. When the positive electrode mixture containing slurry was applied to the aluminum foil, a portion of the aluminum foil was left uncoated and exposed.

Next, the positive electrode precursor was cut so that the area of the positive electrode mixture layer was 30 mm×30 mm, and the exposed portion of the aluminum foil was contained. Moreover, an aluminum lead piece for drawing a current was welded to the exposed portion of the aluminum foil. Thus, a positive electrode provided with a lead was produced.

<Assembly of Battery>

The positive electrode provided with a lead and the negative electrode provided with a lead were superimposed via a PE microporous film separator (thickness: 18 μm) to form a laminated electrode body. The laminated electrode body was inserted into an outer package made of an aluminum laminated film of 90 mm×180 mm. Then, a non-aqueous electrolytic solution obtained by dissolving LiPF$_6$ at a concentration of 1.0 mol/L in a mixed solvent containing ethylene carbonate and dimethyl carbonate at a volume ratio of 3:7 was injected into the outer package, and the outer package was sealed, thereby producing a laminated type non-aqueous secondary battery.

FIG. 1 is a plan view showing the laminated type non-aqueous secondary battery thus produced. In FIG. 1, the laminated type non-aqueous secondary battery 1 of this example is configured so that the laminated electrode body and the non-aqueous electrolytic solution are housed in the outer package 2 that is made of an aluminum laminated film and is rectangular when seen in a plan view. Moreover, a positive electrode external terminal 3 and a negative electrode external terminal 4 are drawn from the same side of the outer package 2.

Example 2

The artificial graphite (the first active material), the pitch-coated graphite (the second active material: the first carbon material), and the carbon-coated SiO (the third active material) were prepared in the same manner as Example 1.

Next, a negative electrode provided with a lead was produced in the same manner as Example 1 except that 48.5 parts by weight of the artificial graphite (the first active material), 48.5 parts by weight of the pitch-coated graphite (the second active material: the first carbon material), and 3 parts by weight of the carbon-coated SiO (the third active material) were used as the negative electrode active material. The negative electrode mixture layer of the negative electrode had a density of 1.4 g/cm$^3$.

Moreover, a laminated type non-aqueous secondary battery was produced in the same manner as Example 1 except that the above negative electrode provided with a lead was used.

Example 3

The artificial graphite (the first active material) and the carbon-coated SiO (the third active material) were prepared in the same manner as Example 1.

Next, as the second active material (the second carbon material), petroleum coke was heat-treated at 1000° C. in an argon atmosphere until the volatile components were removed, thereby providing intermediate crystalline soft carbon. The soft carbon had a D/G ratio of 1.047, where G represents the peak intensity observed in a Raman spectrum from 1578 to 1592 cm$^{-1}$ and D represents the peak intensity observed in a Raman spectrum from 1349 to 1353 cm$^{-1}$ of Raman spectroscopy.

Subsequently, a negative electrode provided with a lead was produced in the same manner as Example 1 except that the 50 parts by weight of the artificial graphite (the first active material), 40 parts by weight of the soft carbon (the second active material: the second carbon material), and 10 parts by weight of the carbon-coated SiO (the third active material) were used as the negative electrode active material. The negative electrode mixture layer of the negative electrode had a density of 1.2 g/cm$^3$.

Moreover, a laminated type non-aqueous secondary battery was produced in the same manner as Example 1 except that the above negative electrode provided with a lead was used.

Example 4

The artificial graphite (the first active material) and the carbon-coated SiO (the third active material) were prepared in the same manner as Example 1, and the soft carbon (the second active material: the second carbon material) was prepared in the same manner as Example 3.

Next, a negative electrode provided with a lead was produced in the same manner as Example 1 except that 57 parts by weight of the artificial graphite (the first active material), 40 parts by weight of the soft carbon (the second active material: the second carbon material), and 3 parts by weigh of the carbon-coated SiO (the third active material) were used as the negative electrode active material. The negative electrode mixture layer of the negative electrode had a density of 1.2 g/cm$^3$.

Moreover, a laminated type non-aqueous secondary battery was produced in the same manner as Example 1 except that the above negative electrode provided with a lead was used.

Example 5

The artificial graphite (the first active material), the pitch-coated graphite (the second active material: the first carbon material), and the carbon-coated SiO (the third active material) were prepared in the same manner as Example 1, and the soft carbon (the second active material: the second carbon material) was prepared in the same manner as Example 3.

Next, a negative electrode provided with a lead was produced in the same manner as Example 1 except that 10 parts by weight of the artificial graphite (the first active material), 47 parts by weight of the pitch-coated graphite (the second active material: the first carbon material), 40 parts by weight of the soft carbon (the second active material: the second carbon material), and 3 parts by weight of the carbon-coated SiO (the third active material) were used as the negative electrode active material. The negative electrode mixture layer of the negative electrode had a density of 1.4 g/cm$^3$.

Moreover, a laminated type non-aqueous secondary battery was produced in the same manner as Example 1 except that the above negative electrode provided with a lead was used.

Comparative Example 1

The artificial graphite (the first active material) and the pitch-coated graphite (the second active material) were prepared in the same manner as Example 1.

Next, a negative electrode provided with a lead was produced in the same manner as Example 1 except that 50 parts by weight of the artificial graphite (the first active material) and 50 parts by weight of the pitch-coated graphite (the second active material: the first carbon material) were used as the negative electrode active material, and the carbon-coated SiO (the third active material) was not used. The negative electrode mixture layer of the negative electrode had a density of 1.5 g/cm$^3$.

Moreover, a laminated type non-aqueous secondary battery was produced in the same manner as Example 1 except that the above negative electrode provided with a lead was used.

Comparative Example 2

The artificial graphite (the first active material) was prepared in the same manner as Example 1, and the soft carbon (the second active material: the second carbon material) was prepared in the same manner as Example 3.

Next, a negative electrode provided with a lead was produced in the same manner as Example 1 except that 50 parts by weight of the artificial graphite (the first active material) and 50 parts by weight of the soft carbon (the second active material: the second carbon material) were used as the negative electrode active material, and the carbon-coated SiO (the third active material) was not used. The negative electrode mixture layer of the negative electrode had a density of 1.3 g/cm$^3$.

Moreover, a laminated type non-aqueous secondary battery was produced in the same manner as Example 1 except that the above negative electrode provided with a lead was used.

Comparative Example 3

The artificial graphite (the first active material), the pitch-coated graphite (the second active material: the first carbon material), and the carbon-coated SiO (the third active material) were prepared in the same manner as Example 1.

Next, a negative electrode provided with a lead was produced in the same manner as Example 1 except that 48.5 parts by weight of the artificial graphite (the first active material), 48.5 parts by weight of the pitch-coated graphite (the second active material: the first carbon material), and 3 parts by weight of the carbon-coated SiO (the third active material) were used as the negative electrode active material. The negative electrode mixture layer of the negative electrode had a density of 1.5 g/cm$^3$.

Moreover, a laminated type non-aqueous secondary battery was produced in the same manner as Example 1 except that the above negative electrode provided with a lead was used.

Comparative Example 4

The artificial graphite (the first active material) and the carbon-coated SiO (the third active material) were prepared in the same manner as Example 1, and the soft carbon (the second active material: the second carbon material) was prepared in the same manner as Example 3.

Next, a negative electrode provided with a lead was produced in the same manner as Example 1 except that 48.5 parts by weight of the artificial graphite (the first active material), 48.5 parts by weight of the soft carbon (the second active material: the second carbon material), and 3 parts by weight of the carbon-coated SiO (the third active material) were used as the negative electrode active material. The negative electrode mixture layer of the negative electrode had a density of 1.3 g/cm$^3$.

Moreover, a laminated type non-aqueous secondary battery was produced in the same manner as Example 1 except that the above negative electrode provided with a lead was used.

Comparative Example 5

The artificial graphite (the first active material) and the carbon-coated SiO (the third active material) were prepared in the same manner as Example 1, and the soft carbon (the second active material: the second carbon material) was prepared in the same manner as Example 3.

Next, a negative electrode provided with a lead was produced in the same manner as Example 1 except that 48.5 parts by weight of the artificial graphite (the first active material), 48.5 parts by weight of the soft carbon (the second active material: the second carbon material), and 3 parts by weight of the carbon-coated SiO (the third active material) were used as the negative electrode active material. The negative electrode mixture layer of the negative electrode had a density of 1.2 g/cm³.

Moreover, a laminated type non-aqueous secondary battery was produced in the same manner as Example 1 except that the above negative electrode provided with a lead was used.

Comparative Example 6

The artificial graphite (the first active material) and the carbon-coated SiO (the third active material) were prepared in the same manner as Example 1, and the soft carbon (the second active material: the second carbon material) was prepared in the same manner as Example 3.

Next, a negative electrode provided with a lead was produced in the same manner as Example 1 except that 45 parts by weight of the artificial graphite (the first active material), 45 parts by weight of the soft carbon (the second active material: the second carbon material), and 10 parts by weight of the carbon-coated SiO (the third active material) were used as the negative electrode active material. The negative electrode mixture layer of the negative electrode had a density of 1.3 g/cm³.

Moreover, a laminated type non-aqueous secondary battery was produced in the same manner as Example 1 except that the above negative electrode provided with a lead was used.

Comparative Example 7

The artificial graphite (the first active material), the pitch-coated graphite (the second active material: the first carbon material), and the carbon-coated SiO (the third active material) were prepared in the same manner as Example 1.

Next, a negative electrode provided with a lead was produced in the same manner as Example 1 except that 45 parts by weight of the artificial graphite (the first active material), 45 parts by weight of the pitch-coated graphite (the second active material: the first carbon material), and 10 parts by weight of the carbon-coated SiO (the third active material) were used as the negative electrode active material. The negative electrode mixture layer of the negative electrode had a density of 1.5 g/cm³.

Moreover, a laminated type non-aqueous secondary battery was produced in the same manner as Example 1 except that the above negative electrode provided with a lead was used.

Comparative Example 8

The artificial graphite (the first active material), the pitch-coated graphite (the second active material: the first carbon material), and the carbon-coated SiO (the third active material) were prepared in the same manner as Example 1, and the soft carbon (the second active material: the second carbon material) was prepared in the same manner as Example 3.

Next, a negative electrode provided with a lead was produced in the same manner as Example 1 except that 5 parts by weight of the artificial graphite (the first active material), 52 parts by weight of the pitch-coated graphite (the second active material: the first carbon material), 40 parts by weight of the soft carbon (the second active material: the second carbon material), and 3 parts by weight of the carbon-coated SiO (the third active material) were used as the negative electrode active material. The negative electrode mixture layer of the negative electrode had a density of 1.4 g/cm³.

Moreover, a laminated type non-aqueous secondary battery was produced in the same manner as Example 1 except that the above negative electrode provided with a lead was used.

Table 1 shows the composition ratio of the negative electrode active material and the density of the negative electrode mixture layer of each of the batteries in Examples 1 to 5 and Comparative Examples 1 to 8.

TABLE 1

| | Composition ratio of negative electrode active material (wt %) | | | | Density of negative electrode mixture layer (g/cm³) |
|---|---|---|---|---|---|
| | Artificial graphite (first active material) | Pitch-coated graphite (second active material) | Soft carbon (second active material) | Carbon-coated SiO (third active material) | |
| Ex. 1 | 45 | 45 | — | 10 | 1.4 |
| Ex. 2 | 48.5 | 48.5 | — | 3 | 1.4 |
| Ex. 3 | 50 | — | 40 | 10 | 1.2 |
| Ex. 4 | 57 | — | 40 | 3 | 1.2 |
| Ex. 5 | 10 | 47 | 40 | 3 | 1.4 |
| Comp. Ex. 1 | 50 | 50 | — | — | 1.5 |
| Comp. Ex. 2 | 50 | — | 50 | — | 1.3 |
| Comp. Ex. 3 | 48.5 | 48.5 | — | 3 | 1.5 |
| Comp. Ex. 4 | 48.5 | — | 48.5 | 3 | 1.3 |
| Comp. Ex. 5 | 48.5 | — | 48.5 | 3 | 1.2 |
| Comp. Ex. 6 | 45 | — | 45 | 10 | 1.3 |
| Comp. Ex. 7 | 45 | 45 | — | 10 | 1.5 |
| Comp. Ex. 8 | 5 | 52 | 40 | 3 | 1.4 |

Next, peel tests were performed using the negative electrodes produced in Examples 1 to 5 and Comparative Examples 1 to 8. Moreover, the charge-discharge load characteristics (the charge load characteristics and the discharge load characteristics) and the charge-discharge cycle characteristics of each of the batteries produced in Examples 1 to 5 and Comparative Examples 1 to 8 were evaluated.

<Peel Test>

In the peel test, the adhesive strength between the negative electrode mixture layer and the current collector was evaluated by performing a scratch test with a sapphire needle having a tip radius of 50 μm using a scratch tester "CSR-1000" manufactured by Rhesca Corporation. Specifically, the sapphire needle was brought into contact with the negative electrode mixture layer, and the load of the sapphire needle was changed to determine a critical load at which the negative electrode mixture layer started to peel off the current collector based on a change in resistance curve of the sapphire needle. Then, the adhesive strength between the negative electrode mixture layer and the current collector was evaluated with the resistance to scratching at the critical load of the sapphire needle. If the critical load was 13 g or more, the adhesive strength was sufficient, and it was considered that the battery passed the peel test. If the critical load was less than 13 g, it was considered that the battery failed the peel test.

<Charge-Discharge Load Characteristics>

A constant-current charge was performed at a current value of 0.2 C until the voltage reached 4.2 V, and subsequently a constant-voltage charge was performed at 4.2 V until the current value reached 0.1 CmA. Then, the battery was discharged at a current value of 0.2 C until the voltage was reduced to 2.5 V, and subsequently a constant-current charge A was performed at a current value of 2 C until the voltage reached 4.2 V, and a constant-voltage charge B was performed at 4.2 V until the current value reached 0.2 CmA. At this time, the charge capacity of the constant-current charge A was divided by the charge capacity of the constant-voltage charge B, and the resultant value C expressed as a percentage was used to evaluate the charge load characteristics. A larger value C indicates better charge load characteristics.

Next, a constant-current charge was performed at a current value of 0.2 C until the voltage reached 4.2 V, and subsequently a constant-voltage charge was performed at 4.2 V until the current value reached 0.1 CmA. Then, a discharge capacity D was measured when the battery was discharged at a current value of 2 C until the voltage was reduced to 2.5 V. Thereafter, the battery was charged in the same manner as described above, and a discharge capacity E was measured when the battery was discharged at a current value of 0.2 C until the voltage was reduced to 2.5 V. At this time, the discharge capacity D was divided by the discharge capacity E, and the resultant value F expressed as a percentage was used to evaluate the discharge load characteristics. A larger value F indicates better discharge load characteristics.

<Charge-Discharge Cycle Characteristics>

The battery was charged by performing a constant-current charge at a current value of 2 C until the voltage reached 4.2 V and subsequently a constant-voltage charge at 4.2 V until the current value reached 0.2 CmA, and then the battery was discharged at a constant current value of 2 C until the voltage was reduced to 2.5 V. Defining this series of operations as a cycle, the battery was repeatedly charged and discharged, and the discharge capacity was measured in the 300th cycle.

Table 2 shows the results of the peel tests and the charge-discharge characteristics.

TABLE 2

| | | Charge-discharge characteristics | | |
| | Peel test | C value of charge load characteristics (%) | F value of discharge load characteristics (%) | Discharge capacity in the 300th cycle (mAh) |
| --- | --- | --- | --- | --- |
| Ex. 1 | Passed | 75 | 76 | 25.8 |
| Ex. 2 | Passed | 74 | 73 | 26.3 |
| Ex. 3 | Passed | 78 | 77 | 24.6 |
| Ex. 4 | Passed | 75 | 74 | 26.6 |
| Ex. 5 | Passed | 73 | 75 | 25.1 |
| Comp. Ex. 1 | Passed | 45 | 57 | 20.5 |
| Comp. Ex. 2 | Failed | 50 | 59 | 20.1 |
| Comp. Ex. 3 | Passed | 60 | 64 | 21.8 |
| Comp. Ex. 4 | Failed | 66 | 68 | 19.0 |
| Comp. Ex. 5 | Failed | 68 | 71 | 19.9 |
| Comp. Ex. 6 | Failed | 71 | 70 | 16.8 |
| Comp. Ex. 7 | Passed | 70 | 71 | 19.9 |
| Comp. Ex. 8 | Passed | 65 | 68 | 19.0 |

As can be seen from Table 2, Examples 1 to 5 of the present invention are superior to Comparative Examples 1 to 8 in all the adhesive strength between the negative electrode mixture layer and the current collector (the peel test results), the charge load characteristics, the discharge load characteristics, and the discharge capacity in the 300th cycle.

On the other hand, the charge-discharge characteristics are reduced in Comparative Examples 1 and 2 where the carbon-coated SiO (the third active material) was not used, in Comparative Examples 3 and 7 where the density of the negative electrode mixture layer was more than 1.4 g/cm$^3$, and in Comparative Example 8 where the content of the artificial graphite (the first active material) was less than 10 wt % of the total weight of the negative electrode active material.

Moreover, not only the charge-discharge characteristics, but also the adhesive strength between the negative electrode mixture layer and the current collector (the peel test results) is reduced in Comparative Examples 2, 4, 5, and 6 where the content of the soft carbon (the second active material: the second carbon material) was more than 40 wt % of the total weight of the negative electrode active material.

Example 9

A negative electrode provided with a lead was produced in the same manner as Example 5 except that the vapor grown carbon fiber having a fiber length of 15 μm was further added to the negative electrode mixture layer as a conductive assistant in an amount of 1 part by weight with respect to 100 parts by weight of the negative electrode active material. The negative electrode mixture layer of the negative electrode had a density of 1.4 g/cm$^3$.

Moreover, a laminated type non-aqueous secondary battery was produced in the same manner as Example 1 except that the above negative electrode provided with a lead was used.

Example 10

A negative electrode provided with a lead was produced in the same manner as Example 5 except that the carbon black having an oil absorption value of 1.5 mL/g and a specific surface area of 13 m$^2$/g was further added to the negative electrode mixture layer as a conductive assistant in an amount of 1 part by weight with respect to 100 parts by weight of the negative electrode active material. The negative electrode mixture layer of the negative electrode had a density of 1.4 g/cm$^3$.

Moreover, a laminated type non-aqueous secondary battery was produced in the same manner as Example 1 except that the above negative electrode provided with a lead was used.

Example 11

As a binder, fluorocarbon rubber "AFLAS" (trade name) manufactured by ASAHI GLASS CO., LTD was dispersed in water using a polyoxyethylene-polyoxypropylene block polymer as a surface-active agent to prepare a fluororubber binder. The fluorocarbon rubber is made of a polymer that includes tetrafluoroethylene as a monomer unit.

A negative electrode provided with a lead was produced in the same manner as Example 5 except that 1 part by weight of the fluororubber binder was used instead of the CMC and the SBR as the binder of the negative electrode mixture. The negative electrode mixture layer of the negative electrode had a density of 1.4 g/cm$^3$.

Moreover, a laminated type non-aqueous secondary battery was produced in the same manner as Example 1 except that the above negative electrode provided with a lead was used.

Table 3 shows the composition ratio of the negative electrode active material and the density of the negative electrode mixture layer of each of the batteries in Examples 9 to 11.

TABLE 3

| | Composition ratio of negative electrode active material (wt %) | | | | Density of negative electrode mixture layer (g/cm$^3$) |
|---|---|---|---|---|---|
| | Artificial graphite (first active material) | Pitch-coated graphite (second active material) | Soft carbon (second active material) | Carbon-coated SiO (third active material) | |
| Ex. 9 | 10 | 47 | 40 | 3 | 1.4 |
| Ex. 10 | 10 | 47 | 40 | 3 | 1.4 |
| Ex. 11 | 10 | 47 | 40 | 3 | 1.4 |

Next, the charge-discharge load characteristics (the charge load characteristics and the discharge load characteristics) and the charge-discharge cycle characteristics of each of the batteries produced in Examples 9 to 11 were evaluated in the same manner as described above. Table 4 shows the evaluation results of Examples 9 to 11 along with Example 5.

TABLE 4

| | Charge-discharge characteristics | | |
|---|---|---|---|
| | C value of charge load characteristics (%) | F value of discharge load characteristics (%) | Discharge capacity in the 300th cycle (mAh) |
| Ex. 5 | 73 | 75 | 25.1 |
| Ex. 9 | 75 | 76 | 28.8 |
| Ex. 10 | 76 | 76 | 27.7 |
| Ex. 11 | 76 | 76 | 29.5 |

As can be seen from Table 4, the discharge capacity in the 300th cycle is larger in Example 9 where the negative electrode mixture layer included the vapor grown carbon fiber having a fiber length of 15 μm as a conductive assistant, in Example 10 where the negative electrode mixture layer included the carbon black having an oil absorption value of 15 mL/g and a specific surface area of 13 m$^2$/g as a conductive assistant, and in Example 11 where the negative electrode mixture layer included the fluororubber binder as a binder than in Example 5.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

| Description of Reference Numerals | |
|---|---|
| 1 | Laminated type non-aqueous secondary battery |
| 2 | Outer package |
| 3 | Positive electrode external terminal |
| 4 | Negative electrode external terminal |

The invention claimed is:

1. A non-aqueous secondary battery comprising:
a positive electrode;
a negative electrode;
a non-aqueous electrolyte; and
a separator,
wherein the positive electrode comprises a positive electrode mixture layer that includes a positive electrode active material,
the positive electrode mixture layer has a thickness of 70 to 300 μm per one side,
the negative electrode comprises a negative electrode mixture layer that includes a negative electrode active material and a binder,
the negative electrode mixture layer has a density of 1.4 g/cm$^3$ or less,
the negative electrode active material includes a first active material, a second active material, and a third active material,
D50 of the first active material is 15 μm to 20 μm,
the first active material is a carbon material having a D/G ratio of 0.15 or less, where G represents a peak intensity observed in a Raman spectrum from 1578 to 1592 cm$^{-1}$ and D represents a peak intensity observed in a Raman spectrum from 1349 to 1353 cm$^{-1}$ of Raman spectroscopy,
D50 of the second active material is 10 μm or less,
the second active material includes at least one of a first carbon material having the D/G ratio of 0.2 to 2.0 and a second carbon material having the D/G ratio of 1.0 to 2.0,
D50 of the third active material is 5 μm or less,
the third active material contains silicon and oxygen as constituent elements,
a content of the first active material is 10 wt % to 57 wt % of a total weight of the negative electrode active material,
a content of the third active material is 1 wt % to 10 wt % of the total weight of the negative electrode active material, and
when the second active material includes the second carbon material, a content of the second carbon material is 40 wt % or less of the total weight of the negative electrode active material.

2. The non-aqueous secondary battery according to claim 1, wherein electric capacity per unit area of one side of the positive electrode mixture layer is 3 mAh/cm$^2$ or more.

3. The non-aqueous secondary battery according to claim 1, wherein the negative electrode mixture layer further includes a vapor grown carbon fiber having a fiber length of 10 μm to 20 μm, and a carbon material having a specific surface area of 13 m$^2$/g or less and an oil absorption value of 1.5 mL/g or less.

4. The non-aqueous secondary battery according to claim 1, wherein the binder includes fluorocarbon rubber made of a polymer that includes at least one monomer unit selected from tetrafluoroethylene and hexafluoropropylene.

* * * * *